July 5, 1955 R. M. BRINK 2,712,574
INVERSE FEED-BACK STABILIZED DIRECT CURRENT AMPLIFIER
Filed May 9, 1950
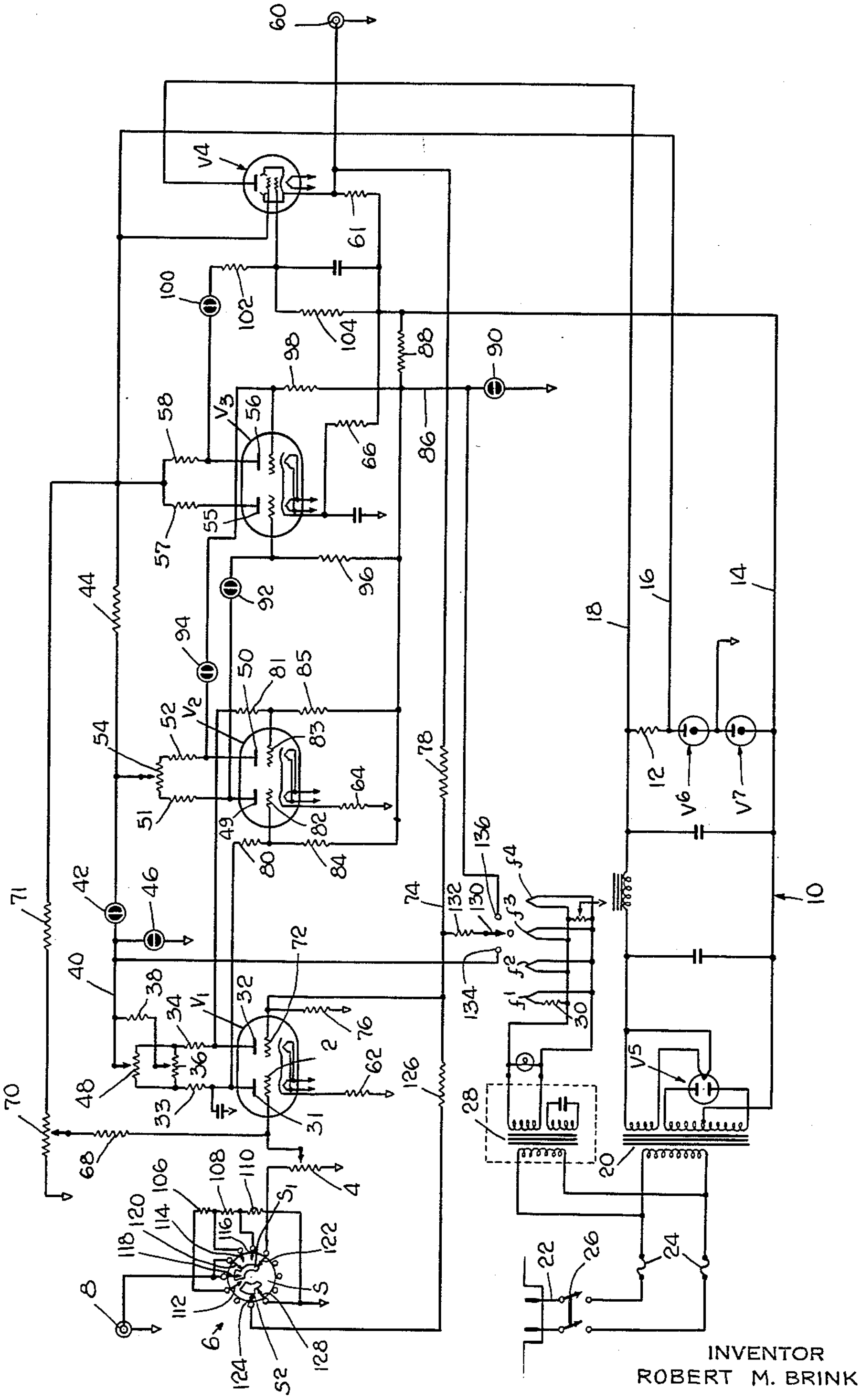
INVENTOR
ROBERT M. BRINK
BY
Louisa E. Norton
ATTORNEY 2,712,574

INVERSE FEED-BACK STABILIZED DIRECT CURRENT AMPLIFIER

Robert M. Brink, Stamford, Conn., assignor, by mesne assignments, to Deering Milliken Research Corporation, near Pendleton, S. C., a corporation of Delaware Application May 9, 1950, Serial No. 160,903

3 Claims. (Cl. 179—171)

The present invention relates to amplifiers and comprises a novel, statically balanced direct current amplifier that does not require phase inversion in the input circuit nor an above ground output circuit. The new amplifier, while utilizing several stages of push-pull amplification, is single-ended both at input and at output and thus avoids disadvantages inherent in amplifiers that utilize a push-pull arrangement throughout. The new amplifier is particularly adapted for use with recording instruments for amplifying the signal to be delivered to the motor driving the indicating element. For example, the output of the amplifier may be delivered to the pen motor of a recorder of the type manufactured by the Brush Development Corporation.

The new direct current amplifier, in the preferred embodiment of the invention includes three stages of push-pull amplification with inversion in the second and third stage, a cathode follower output tube and an inverse feed back connection from the output to the first stage.

A feature of the invention is the arrangement whereby complete inversion is obtained in the last push-pull stage of the amplifier.

Another feature of the new amplifier is the means for optionally changing the output "zero" when it is desired that the reference line of a recorder pen be at either edge of the chart, rather than at the center of the chart.

The single figure of the drawing is a circuit diagram of an amplifier representing a preferred embodiment of the invention.

The three push-pull stages of the amplifier include the double triodes $V_1$, $V_2$ and $V_3$, each of which may be a 6SC7. The grid 2 of the first half of the tube $V_1$ is connected through a gain control 4 and step attenuator 6 to the input jack terminals 8 for the signal to be amplified. The plate voltage for tubes $V_1$, $V_2$ and $V_3$, as well as for the output tube $V_4$ of the amplifier, provided by a rectifier tube $V_5$ and a filter network 10, is regulated by voltage regulators $V_6$ and $V_7$ connected in series with a resistor 12 across the filter output terminals, the circuit being grounded between the regulators $V_6$ and $V_7$ to provide a below ground lead 14 connected to the cathode of $V_7$. A lead 16, the potential of which balances that of lead 14, is connected to the anode of $V_6$ and a high potential lead 18 is connected to the high potential output lead of the filter 10. A transformer 20 couples the rectifier tube $V_5$ to A. C. power lines 22, suitable fuses 24 and manually operable switch 26 being provided in the leads to the transformer primary. The cathode heaters of tubes $V_1$, $V_2$, $V_3$ and $V_4$, indicated respectively at $f1$, $f2$, $f3$ and $f4$, are energized from the power lines 22 through a step down transformer 28, a resistor 30 being provided in series with $f1$ to operate that filament at reduced voltage and thereby minimize grid current.

The anodes 31 and 32 of tube $V_1$ are connected respectively through potential dropping resistors 33 and 34 to opposite ends of a resistor 36, a variable tap on which is connected through a resistor 38 to a line 40 which is connected to line 16 through series connected neon glow lamp 42 and a resistor 44. A glow lamp 46 connected between line 40 and ground provides additional voltage regulation for line 40. Resistor 36, together with a resistor 48 connected in parallel thereto and having a variable tap connected to line 40, provides the "zero" controls for the amplifier, resistor 48 being of less ohmage than resistor 36 and serving for final adjustment of balance of the circuit.

The anodes 49 and 50 of tube $V_2$ are respectively connected through dropping resistors 51 and 52 to opposite ends of a resistor 54, a variable tap on which is connected to line 16 through the resistor 44 and the anodes 55 and 56 of tube $V_3$ are respectively connected through dropping resistors 57 and 58 to line 16.

The output tube $V_4$, which may be a 6Y6, has its screen grid connected to line 16, its anode connected to the high potential line 18 and its cathode and suppresser grid connected to the ungrounded terminal of output jack terminals 60 and, through a cathode resistor 61, to the negative potential line 14.

The cathodes of tubes $V_1$ and $V_2$ are operated at above ground potentials, the cathode of tube $V_1$ being connected to ground through a resistor 62, and the cathode of tube $V_2$ being connected to ground through a resistor 64. The cathode of tube $V_3$ is connected to the below-ground lead 14 through a resistor 66.

The grid 2 of tube $V_1$ is connected through a high resistor 68 to a tap on a resistor 70, one end of which is grounded and the other end of which is connected through a resistor 71 to the positive lead 16. This connection of the grid 2 to a source of small positive potential provides a constant unidirectional current sufficient to buck the grid current of the first half of tube $V_1$ and prevent zero shift of the amplifier with setting of the gain control 4.

The grid 72 of tube $V_1$ is connected to a lead 74 and to ground through a biasing resistor 76. Lead 74 which is connected through a high resistor 78 to the ungrounded output jack terminal 60, serves to insert feed back to tube $V_1$ from the output tube $V_4$.

Tubes $V_1$ and $V_2$ are coupled by a conventional resistive voltage divider circuit comprising resistors 80 and 81 connected respectively between the anode 31 of the tube $V_1$ and grid 82 of tube $V_2$ and between the anode 32 of tube $V_1$ and grid 83 of tube $V_2$ and grid resistors 84 and 85, respectively connected to grids 82 and 83. Resistors 84 and 85 are connected to a lead 86 which is connected through a resistor 88 with the below-ground lead 14 and the potential of which is controlled by a neon glow lamp 90.

Coupling from tube $V_2$ to tube $V_3$ is by means of neon glow lamps 92 and 94. This type of coupling prevents loss of gain. Grid resistors 96 and 98 are returned to the regulated negative voltage lead 86. Tube $V_3$ is operated with complete inversion, the cathode resistor 66 being slightly higher than the plate load resistor comprising the resistors 57 and 58.

The output from tube $V_3$ is taken only from the second half of the tube, anode 56 being coupled by neon glow lamp 100 and resistor 102 to the control grid of the cathode follower output tube $V_4$. Grid resistor 104 of tube $V_4$ is returned to the negative lead 14.

The step attenuator comprises a five position rotary switch S and three series connected resistors 106, 108 and 110. One end of resistor 106 is connected to a fixed contact 112 of switch S and one end of resistor 110 is grounded. The junction of resistors 106 and 108 is connected to a fixed contact 114 and the junction of resistors 108 and 110 is connected to another fixed contact 116 of the switch. The input lead from jack terminal 8 is connected to adjacent fixed contacts 118 and 120. The ungrounded end of grid resistor 4 is connected to a fixed contact 122 of the switch S. An additional fixed contact 124 of the switch is connected, for a purpose hereinafter to be described, the lead 74 through a resistor 126 of a magnitude substantially equal to that of grid resistor 76. The movable elements of switch S comprise a pair of arcuate conducting segments $S_1$ and $S_2$ which are adapted to be rotated together in a clockwise direction from the position shown in the drawing and hereinafter referred to as position "No. 1". Segment $S_1$ has a radial extension thereon engageable in position No. 1 by contact 118 and successively engageable by contacts 120, 114, 116 and 122 when the switch is rotated through positions 2, 3 and 4 to position 5. Contacts 114 and 116 are short contacts and hence are engageable only by the radial extension of segment $S_1$ whereas contact 122 is a long contact and engages segment $S_1$ in each position of the switch. Segment $S_2$ has a radial extension thereon of an arcuate length sufficient to engage and span adjacent fixed contacts of the switch. In position No. 1, segment $S_2$ engages a fixed contact 128 which is grounded, and the extension thereon engages contact 124.

From the foregoing description of the step attenuator and from the drawing, it will be apparent that when the switch is in position No. 1, the input lead from jack terminal 8 is connected through contact 118, segment $S_1$ and contact 122 to the gain control resistor 4 and one end of resistor 126 is grounded through contact 124, segment $S_2$ and contact 128. In position No. 2, the ground connection of resistor 126 is broken at contact 128 but the connection of the input lead to resistor 4 is maintained through contact 120. In position No. 3, the input signal lead is connected to ground through series connected resistors 106, 108 and 110 and the junction of resistors 106 and 108 is connected to the ungrounded end of resistor 4 whereas in position No. 4, it is the junction of resistors 108 and 110 that is connected to resistor 4. In position No. 5, the "no-signal" position, resistor 4 is grounded at both ends.

The operation of the circuit so far described will be readily apparent to those skilled in the art. With switch S in position No. 5, the taps on resistors 36 and 48 can be adjusted to bring the cathode of the output tube to ground potential, corresponding to "no signal." The switch S can then be set to position No. 2, 3 or 4, depending upon the attenuation desired and the signal voltage to be amplified connected to the circuit at input jack terminal 8. The signal voltage appearing at grid 2 of the tube $V_1$ is amplified and applied in push-pull to tube $V_2$ where it is amplified, inverted and applied to tube $V_3$. Tube $V_3$ is operated with complete inversion, as heretofore indicated and the amplified signal appearing at anode 56 thereof is applied through glow lamp 100 and resistor 102 to the control grid of output tube $V_4$, yielding an amplified output signal across the output jack terminals of the same sign as that appearing across the input terminals.

The feed back connection from the output to the grid 72 of tube $V_1$ insures stability of the amplifier but does not permit much leeway in shift of output "zero." Therefore, when it is desired that under no signal conditions there be a steady and substantial output voltage, either positive or negative, as for example, when the pen of a recorder is to be zeroed at one or the other edge of the chart, the switch S is turned to position No. 1 and a positive or negative decentering potential is applied to grid 72 by suitable setting of a switch 130 the movable contact of which is connected through a high resistor 132 to the line 74 and the fixed contacts 134 and 136 of which are connected respectively to positive line 40 and negative line 86.

From the foregoing description of the preferred embodiment of the invention, it will be apparent that the new amplifier retains the advantages of push-pull amplification while utilizing single-ended input and output circuits. The amplifier circuit provides relatively high gain without recourse to careful watching of tubes and components. As the new amplifier does not require an above ground output circuit, it is of particular value for use in driving existing recording equipment. Other advantageous applications thereof will be apparent to those skilled in the art.

The following is claimed:

1. A direct current amplifier comprising an odd number of stages of push-pull amplification feeding into a single tube amplifier output stage, at least the first of said push-pull stages including a double triode having a common cathode connected to operate above ground potential, a single ended input connection feeding into one grid of said double triode and an inverse feedback connection from the cathode of the tube in said output stage to the other grid of said double triode to cause said first stage of said amplifier to operate without phase inversion, said amplifier including a regulated voltage supply providing above and below ground lines, said output stage constituting a cathode follower circuit including a pentode, the cathode of said pentode being connected to the output terminal and through a cathode resistor to a line from said source, the potential of which is substantially below ground potential and the anode of said pentode being connected to a line from said source of high positive potential.

2. The amplifier according to claim 1 wherein the last stage of push-pull amplification includes a double triode having a common cathode connected through a resistor to a below ground line from said source, the control grids of said double triode being coupled to the preceding stage and the anodes of said double triode being connected through potential dropping resistors to a line from said source of a positive potential less than that of the line connected to the anode of said pentode, the control grid of said pentode being connected through series connected resistor and glow lamp to one anode of said double triode.

3. A direct current amplifier comprising in combination an odd number of stages of push-pull amplification feeding into a single pentode tube cathode follower output amplifier stage, at least the first of said push-pull stages including a double triode having a common cathode connected to operate above ground potential, a single ended input connection feeding into one grid of said double triode, an inverse feedback connection from the cathode of said pentode to the other grid of said double triode to cause said first stage of amplification to operate without phase inversion, the last stage of push-pull amplification including a double triode having a common cathode, the grids of said latter triode being coupled in push-pull to the preceding stage and one anode only of said latter triode being coupled to the grid of said pentode, a regulated voltage supply providing above and below ground lines, the common cathode of said last double triode being connected to a below ground line through a resistor, the grids of said last double triode being connected through resistors to a line of lesser negative potential and the anodes of said last double triode being connected through potential dropping resistors with a first above ground line, the screen grid of said pentode being connected to said first above ground line and the anode of said pentode being connected to an above ground line of a potential higher than that of the line to which the anodes of said last double triode are connected, the control grid of said pentode being coupled to one anode of said last double triode and to a below ground line through a resistor and the suppressor grid and cathode of said pentode being connected to the output connection and to said inverse feed-back and through a resistor to a below ground line.

References Cited in the file of this patent

UNITED STATES PATENTS

| | | |
|---|---|---|
| 2,265,538 | Minton | Dec. 9, 1941 |
| 2,289,301 | Barber | July 7, 1942 |

(Other references on following page)

UNITED STATES PATENTS

| | | |
|---|---|---|
| 2,411,440 | Le Page | Nov. 19, 1946 |
| 2,431,973 | White et al. | Dec. 2, 1947 |
| 2,523,468 | Hare | Sept. 26, 1950 |
| 2,530,101 | Van Loon et al. | Nov. 14, 1950 |
| 2,541,811 | Crownover et al. | Feb. 13, 1951 |

FOREIGN PATENTS

| | | |
|---|---|---|
| 912,155 | France | Oct. 1, 1946 |

OTHER REFERENCES

"Review of Scientific Instruments," vol. 18, No. 9, pages 610–616 (Sept. 1947), "Some Designs for Packaged Amplifiers Using Subminiature Tubes."